United States Patent
Chai et al.

(10) Patent No.: US 6,642,339 B1
(45) Date of Patent: Nov. 4, 2003

(54) LOW DENSITY COPOLYMERS OF ETHYLENE AND ALPHA-OLEFINS

(75) Inventors: Choon Kooi Chai, Cabries (FR); Christopher James Frye, St Julien-Martigues (FR)

(73) Assignee: BP Chemicals Limited, London (GB)

( * ) Notice: Subject to any disclaimer, the term of this patent is extended or adjusted under 35 U.S.C. 154(b) by 74 days.

(21) Appl. No.: 09/695,915

(22) Filed: Oct. 26, 2000

Related U.S. Application Data

(63) Continuation of application No. PCT/GB00/01611, filed on Apr. 26, 2000.

(30) Foreign Application Priority Data

May 5, 1999 (GB) ............................................... 9910370
Nov. 17, 1999 (GB) ............................................... 9927205

(51) Int. Cl.$^7$ ............................................. C08F 210/02
(52) U.S. Cl. .................... 526/348.1; 526/352; 526/161; 526/159; 526/127
(58) Field of Search ............................. 526/348.1, 352, 526/127, 161, 159

(56) References Cited

FOREIGN PATENT DOCUMENTS

| | | |
|---|---|---|
| EP | 0 610 942 | 8/1994 |
| EP | 0 735 060 | 10/1996 |
| WO | WO 94/14855 | 7/1994 |
| WO | WO 95/04761 | 2/1995 |
| WO | WO 97/44371 | * 11/1997 |
| WO | WO 98/18842 | 5/1998 |

* cited by examiner

*Primary Examiner*—Ling-Siu Choi
(74) *Attorney, Agent, or Firm*—Finnegan, Henderson, Farabow, Garrett and Dunner, L.L.P.

(57) ABSTRACT

Copolymers of ethylene and alpha olefins having from 3 to 10 carbon atoms and which have (a) a density in the range 0.900 to 0.940
(b) an apparent Mw/Mn of 2–3.4
(c) $I_{21}/I_2$ from 16 to 21.5
(d) activation energy of flow from 28 to 45 kJ/mol
(e) a ratio Ea(HMW)/Ea(LMW)>1.1, and
(f) a ratio g'(HMW/g'(LMW) from 0.85 to 0.95.

The copolymers are particularly useful in film applications showing an excellent balance of processing, optical and mechanical properties. The novel polymers may suitably be prepared in the gas phase in the presence of metallocene complexes.

8 Claims, No Drawings

LOW DENSITY COPOLYMERS OF ETHYLENE AND ALPHA-OLEFINS

This application is a Continuation of International Application Number PCT/GB00/01611, filed Apr. 26, 2000.

BACKGROUND OF THE INVENTION

The present invention relates to copolymers of ethylene and alpha-olefins in particular to low density copolymers and also to films produced from said copolymers.

In recent years there have been many advances in the production of polyolefin copolymers due to the introduction of metallocene catalysts. Metallocene catalysts offer the advantage of generally higher activity than traditional Ziegler catalysts and are usually described as catalysts which are single-site in nature. Because of their single-site nature the polyolefin copolymers produced by metallocene catalysts often are quite uniform in their molecular structure. For example, in comparison to traditional Ziegler produced materials, they have relatively narrow molecular weight distributions (MWD) and narrow Short Chain Branching Distribution (SCBD).

Although certain properties of metallocene products are enhanced by narrow MWD, difficulties are often encountered in the processing of these materials into useful articles and films relative to Ziegler produced materials. In addition, the uniform nature of the SCBD of metallocene produced materials does not readily permit certain structures to be obtained.

Recently a number of patents have published directed to the preparation of films based on low density polyethylenes prepared using metallocene catalyst compositions.

WO 94/14855 discloses linear low density polyethylene (LLDPE) films prepared using a metallocene, alumoxane and a carrier. The metallocene component is typically a bis (cyclopentadienyl) zirconium complex exemplified by bis (n-butylcyclopentadienyl) zirconium dichloride and is used together with methyl alumoxane supported on silica. The LLDPE's are described in the patent as having a narrow Mw/Mn of 2.5–3.0, a melt flow ratio (MFR) of 15–25 and low zirconium residues.

WO 94/26816 also discloses films prepared from ethylene copolymers having a narrow composition distribution. The copolymers are also prepared from traditional metallocenes (eg bis (1-methyl, 3-n-butylcyclopentadienyl) zirconium dichloride and methylalumoxane deposited on silica) and are also characterised in the patent as having [a] narrow Mw/Mn values typically in the range 3–4 and in addition by a value of Mz/Mw of less than 2.0.

However, it is recognised that the polymers produced from these types of catalyst system have deficiencies in processability due to their narrow Mw/Mn. Various approaches have been proposed in order to overcome this deficiency. An effective method to regain processability in polymers of narrow Mw/Mn is by the use of certain catalysts which have the ability to incorporate long chain branching (LCB) into the polymer molecular structure. Such catalysts have been well described in the literature, illustrative examples being given in WO 93/08221 and EP-A-676421.

Furthermore, WO 97/44371 discloses polymers and films where long chain branching is present, and the products have a particularly advantageous placement of the comonomer within the polymer structure. Polymers are exemplified having both narrow and broad Mw/Mn, for example from 2.19 up to 6.0, and activation energy of flow, which is an indicator of LCB, from 7.39 to 19.2 kcal/mol (31.1 to 80.8 kJ/mol). However, there are no examples of polymers of narrow Mw/Mn, for example less than 3.4, which also have a low or moderate amount of LCB, as indicated by an activation energy of flow less than 11.1 kcal/mol (46.7 kJ/mol).

We have now found that it is possible to prepare copolymers of ethylene and alpha-olefins having narrow Mw/Mn and low or moderate amounts of LCB. These polymers are suitable for many applications which will be known to those skilled in the art, but in particular are advantageous for preparing films with an excellent balance of processing, optical and mechanical properties.

SUMMARY OF THE INVENTION

Thus, according to the present invention there is provided a copolymer of ethylene and an alpha olefin having 3 to 10 carbon atoms, said polymer having
(a) a density in the range 0.900 to 0.940
(b) an apparent Mw/Mn of 2–3.4
(c) $I_{21}/I_2$ from 16 to 24
(d) activation energy of flow from 28 to 45 kJ/mol
(e) a ratio Ea(HMW)/Ea(LMW)>1.1, and
(f) a ratio g'(HMW)/g'(LMW) from 0.85 to 0.95.
Preferred copolymers are those having
(a) a density in the range 0.900 to 0.940
(b) an apparent Mw/Mn in the range 2 to 3
(c) $I_{21}/I_2$ from 18–24
(d) activation energy of flow from 28 to 45 kJ/mol
(e) a ratio Ea(HMW)/Ea(LMW)>1.1, and
(f) a ratio g'(HMW)/g'(LMW) from 0.85 to 0.95.
Most preferred copolymers are those having
(a) a density in the range 0.900 to 0.940
(b) an apparent Mw/Mn in the range 2.5 to 3
(c) $I_{21}/I_2$ from 18–24
(d) activation energy of flow from 30 to 35 kJ/mol
(e) a ratio Ea(HMW)/Ea(LMW)>1.2, and
(f) a ratio g'(HMW)/g'(LMW) from 0.85 to 0.95.
By apparent Mw/Mn is meant a value of Mw/Mn uncorrected for long chain branching.

The significance of the parameters Ea(HMW)/Ea(LMW) and g'(HMW)/g'(LMW) is described below. The experimental procedures for their measurements are described later in the text.

DETAILED DESCRIPTION OF THE INVENTION

The polymers contain an amount of LCB which is clearly visible by techniques such as GPC/viscometry and flow activation energy. The content of LCB is lower than reported in many earlier publications, but is still sufficient, when coupled with broadened Mw/Mn, to give improved processability compared to linear polymers of narrow MWD (Mw/Mn less than about 3), which do not contain LCB.

For the measurement of LCB, we have found that the most useful techniques are those which have a particular sensitivity to the presence of LCB in the high molecular weight chains. For these high molecular weight molecules, the physical effects of LCB on the solution and melt properties of the polymer are maximised. Hence detection of LCB using methods based upon solution and melt properties is facilitated.

Activation energy of flow is commonly used as an indicator of the presence of LCB in polyethylenes as summarised in the aforementioned WO 97/44371. For lower amounts of LCB, for which the global activation energy is of the order of 28 to 45 kJ/mol, it is found that the LCB has a strong effect upon the activation energy as measured at low test rates (ie the region in which the rheology is dominated by the high molecular weight (HMW species). Therefore, the ratio of activation energy derived from the low rate data Ea(HMW) tends to exceed that derived from the high rate data, Ea(LMW). Hence polymers containing LCB predominantly in the high molecular weight chains tend to show the ratio EA(HMW)/Ea(LMW) greater than unity.

A further well established method indicating the presence of LCB is gel permeation chromatography with on-line detection of viscosity (GPC/OLV). By combining the data from 2 detectors, the ratio g' can be derived as a function of molecular weight; g' is the ratio of the measured intrinsic viscosity $[\eta]$ divided by the intrinsic viscosity $[\eta]_{linear}$ of a linear polymer having the same molecular weight. In polymers containing LCB, the g' measured at high molecular weights tends to be less than that measured at low molecular weights. To quantify this effect, we have used a simple ratio g'(HMW)/g'(LMW). g'(HMW) is the weighted mean value of g' calculated for the 30% of the polymer having the highest molecular weight, while g'(LMW) is the weighted mean value of g' calculated for the 30% of the polymer having lowest molecular weight. For linear polymers, g' is equal to 1 at all molecular weights, and so g'(HMW)/g' (LMW) is also equal to 1 when there is no LCB present. For polymers containing LCB, g'(HMW)/g'(LMW) is less than 1. It should be noted that the g' data can be corrected for the effect of short chain branching (SCB). This would normally be done using a mean value of SCB content, the correction being applied uniformly at all molecular weights. Such a correction has not been applied here because in measuring the ratio g'(HMW)/g'(LMW) the same correction would apply to both g' values and there would be no net effect on the results reported here.

Another method to quantify LCB content in polyethylenes is by carbon-13 Nuclear Magnetic Resonance (13C-NMR). For the low amounts of LCB observed for polymers of the invention it is generally accepted that this technique can give a reliable quantification of the number of LCB points present in the polymer when the polymer is a homopolymer or a copolymer of ethylene and propylene or butene-1. For the purposes of this specification, a measurement of LCB by 13C-NMR is achieved in such polymers by quantification of the isolated peak at about 38.3 ppm corresponding to the CH carbon of a tri-functional long chain branch. A tri-functional long chain branch is taken to mean a structure for which at least the first four carbon atoms of each of the 3 chains radiating from the CH branch carbon are all present as CH2 groups. Care must be exercised in making such measures to ensure that sufficient signal:noise is obtained to quantify the resonance and that spurious LCB structures are not generated during the sample heating by oxidation induced free-radical reactions.

The above described analysis of LCB by 13C-NMR is much more difficult when the copolymer contains hexene-1. This is because the resonance corresponding to an LCB is very close to or overlapping that for the CH carbon at the branch site of the n-butyl branch obtained from this comonomer. Unless the two CH resonances can be resolved, which is unlikely using NMR equipment currently available, LCB could only be determined for an ethylene/hexene-1 copolymer using the above described technique if the amount of n-butyl branches was so low, in comparison to the amount of LCB present, that it could either be ignored or a reliable subtraction carried out on the CH resonance at about 38.3 ppm.

Using the preferred catalyst system of the present invention an ethylene/butene-1 copolymer containing 6.5 wt % butene-1 has been prepared using a continuous gas phase reactor. This polymer contained 0.12 LCB/10,000 total carbons using the 13C-NMR technique described above. The spectrum was obtained from a 600 MHz NMR spectrometer after 912,000 scans. The polymer also contained 0.25 n-butyl branches/10,000 total carbons. No detectable oxidation was observed during this analysis with a limit of detection of approximately 0.05/10,000 total carbons.

Despite a relatively low average LCB content, it would be expected that such polymers would show distinctly modified rheological behaviour in comparison with truly linear polymers. If the LCB is concentrated in the molecules of higher molecular weight, as is known to be the case, then an average value of 0.12 LCB/10,000 total carbons in the whole polymer could correspond to about 0.3 or more LCB/10,000 for molecules of molecular weight about one million. Hence these molecules would be expected to contain at least 2 LCB points per molecule, equivalent to a branched structure with 5 arms. Such molecules are known to display very different rheological properties to linear molecules.

The preferred polymers of the invention also show quite low amounts of vinyl unsaturation as determined by either infra-red spectroscopy or preferably proton NMR. For a polymer of melt index (2.16 kg) about 1, values are less than 0.05 vinyl groups per 1000 carbon atoms or even as low as less than 0.02 vinyl groups per 1000 carbon atoms. Again, for melt index.(2.16 kg) about 1, total unsaturations are also low compared to some other metallocene polymers containing LCB, the total unsaturations as measured by proton NMR to be the sum of vinyl, vinylidene, tri-substituted and cis+trans di-substituted internal unsaturation being in the range of less than 0.2 to 0.5 per 1000 carbon atoms. Products with higher or lower melt index, and hence lower or higher number average molecular weights, may show respectively higher or lower terminal unsaturations, in proportion to the total number of chain ends present. Hence the total unsaturations per 1000 carbon atoms are less than 17500/Mn where Mn is the number average molecular weight uncorrected for LCB and the vinyl unsaturations are less than 1750/Mn.

The comonomer present in the preferred polymers of the invention is not randomly placed within the polymer structure. If the comonomer was randomly placed, it would be expected that the elution trace derived from temperature rising elution fractionation (TREF) would show a single narrow peak, the melting endotherm as measured by differential scanning calorimetry would also show a substantially singular and narrow peak. It would also be expected that little variation would be expected in either the amount of comonomer measured as a function of molecular weight by techniques such as GPC/FTIR, or the molecular weight of fractions measured as a function of comonomer content by techniques such as TREF/DV. These techniques for structure determination are also described in the aforementioned WO 97/44371, the relevant parts of which are incorporated herein by reference.

However, the comonomer may be placed in a way as to give a distinct broadening of the TREF elution data, often with the appearance of one or two or even three peaks. At a polymer density of about 918 kg/m$^3$ the TREF data typically show two main peaks, one at about 87° C. and another distinct but smaller peak at about 72° C., the latter being about ⅔ of the height of the former. These peaks represent a heterogeneity in the amount of comonomer incorporated in the polymer chains. A third peak is often visible at about 100° C. Without being bound by any theory this peak is considered to be nothing other than a consequence of the fact that the polymer molecules of low comonomer content tend to crystallise into large chain folded crystals which melt and dissolve in the TREF experiment in a narrow range of temperatures at about 100° C. The same peak is very clearly visible in certain types of LLDPE polymers produced by ziegler catalysts and it is present in TREF analysis of MDPE and HDPE type polyethylenes. Thus, without being bound by any theory, the third peak at about 100° C. is more a result of the crystallisation of linear or near-linear molecules, than a feature which can be simply interpreted as representing a particular and separate polymer species.

The CDBI (Composition Distribution Branch Index) of the polymers is between 55 and 75%, preferably 60 to 75%, reflecting the fact that the polymers are neither highly homogeneous (CDBI>about 90%) nor highly heterogeneous (CDBI<about 40%). The CDBI of a polymer is readily calculated from techniques known in the art, such as, for example, temperature rising elution fractionation (TREF) as described, for example, in Wild et al., Journal of Polymer Science, Polymer Phys. Ed., Vol 20, p441 (1982), or in U.S. Pat. No. 4,798,081.

The behaviour seen in melting endotherms by DSC reflects the behaviour in TREF in that one, two or three peaks are typically seen. For example three peaks are often seen for the preferred polymers of density about 918 kg/m³, when heated at 10° C./min. after crystallisation at the same rate. As is usual, it would be expected that the peaks seen in TREF and DSC would move to lower temperatures for polymers of lower density and to higher temperatures for polymer of higher density. The peak melting temperature Tp (the temperature in ° C. at which the maximum heat flow is observed during the second heating of the polymer) can be approximated by the following expression within normal experimental errors:

$$Tp = 462 \times density - 306$$

The amount of comonomer measured as a function of molecular weight by GPC/FTIR for the preferred polymers shows an increase as molecular weight increases. The associated parameter $C_{pf}$ is greater than 1.1. The measurement of $C_{pf}$ is described in WO 97/44371.

The preferred copolymers of the present invention exhibit extensional Theological behaviour, in particular strain-hardening properties, consistent with the presence of long chain branching.

The copolymers of the present invention may suitably be prepared by use of a metallocene catalyst system comprising, for example a traditional bisCp metallocene complex or a complex having a 'constrained geometry' configuration together with a suitable activator.

Suitable complexes, for example, are those disclosed in WO 95/00526 the disclosure of which is incorporated herein by reference.

Suitable activators may comprise traditional aluminoxane or boron compounds for example borates again disclosed in the aforementioned WO 95/00526.

Preferred metallocene complexes for use in the preparation of the unique copolymers of the present invention may be represented by the general formula:

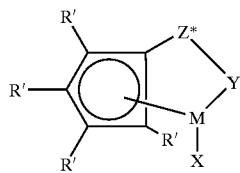

wherein:

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π complex with M;

Y is —O—, —S—, —NR*—, —PR*—,

M is titanium or zirconium in the +2 formal oxidation state;

Z* is SiR*$_2$, CR*$_2$, SiR*$_2$SIR*$_2$, CR*$_2$CR*$_2$, CR*=CR*, CR*$_2$SIR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene, s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group therby being, for example, an indenyl, tetrahydroindenyl, fluorenyl, terahydrofluorenyl, or octahydrofluorenyl group.

Highly preferred Y groups are nitrogen or phosporhus containing groups cotaining a group corresponding to the formula —N(R")— or —P(R")— whererin R" is $C_{1-10}$ hydrocarbyl.

Most preferred complexes are amidosilane- or amidoalkanediyl complexes.

Most preferred complexes are those wherein M is titanium.

Specific complexes suitable for use in the preparation of the novel copolymers of the present invention are those disclosed in the aforementioned WO 95/00526 and are incorporated herein by reference.

A particularly preferred complex for use in the preparation of the novel copolymers of the present invention is (t-butylamido) (tetramethyl-$\eta^5$-cyclopentadienyl) dimethyl silanetitanium -$\eta^4$ -1,3-pentadiene.

The activator may preferably be a boron compound for example a borate such as ammonium salts, in particular.

triethylammonium tetraphenylborate
triethylammonium tetraphenylborate,
tripropylammonium tetraphenylborate, tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl) borate,
triethylammonium tetrakis(pentafluorophenyl) borate,
tripropylammonium tetrakis(pentafluorophenyl) borate,
tri(n-butyl)ammonium tetrakis(pentafluorophenyl) borate,
N,N-dimethylanilinium tetrakis(pentafluorophenyl) borate,
N,N-diethylanilinium tetrakis(pentafluorphenyl) borate.

Another type of activator suitable for use with the metallocene complexes of the present invention are the reaction products of (A) ionic compounds comprising a cation and an anion wherein the anion has at least one substituent comprising a moiety having an active hydrogen and (B) an organometal or metalloid compound wherein the metal or metalloid is from Groups 1–14 of the Periodic Table.

Suitable activators of this type are described in WO 98/27119 the relevant portions of which are incorporated herein by reference.

A particular preferred activator of this type is the reaction product obtained from alkylammonium tris(pentafluorophenyl) 4-(hydroxyphenyl) borates and trialkylaluminium. For example a preferred activator is the reaction product of bis(hydrogenated tallow alkyl) methyl ammonium tris (pentafluorophenyl) (4-hydroxyphenyl) borate and triethylaluminium.

The molar ratio of metallocene complex to activator employed in the process of the present invention may be in the range 1:10000 to 100:1. A preferred range is from 1:5000 to 10:1 and most preferred from 1:10 to 10:1.

The metallocene catalyst system suitable for use in the present invention is most suitably supported. Typically the support can be an organic or inorganic inert solid. However particularly porous supports such as talc, inorganic oxides and resinous support materials such as polyolefins which have well-known advantages in catalysis are preferred. Suitable inorganic oxide materials which may be used include Group 2, 13 14 or 15 metal oxides such as silica, alumina, silica-alumina and mixtures thereof.

Other inorganic oxides that may be employed either alone or in combination with the silica, alumina or silica-alumina are magnesia, titania or zirconia. Other suitable support materials may be employed such as finely divided polyolefins such as polyethylene.

The most preferred support material for use with the supported catalysts according to the process of the present invention is silica. Suitable silicas include Crosfield ES70 and Grace Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure, for example, for 5 hrs.

The support material may be pretreated with an aluminium alkyl at a temperature of –20° C. to 150° C. and preferably at 20° C. to 100° C.

The pretreated support is preferably recovered before use in the preparation of the supported catalysts of the present invention.

The copolymers of the present invention comprise copolymers of ethylene and alpha-olefins having 3 to 10 carbon atoms. Preferred alpha olefins comprise 1-butene, 1-hexene and 4-methyl-1-pentene. A particularly preferred alpha olefin is 1-hexene.

Thus according to another aspect of the present invention there is provided a process for preparing copolymers as hereinbefore described comprising polymerising ethylene and alpha olefins having 3 to 10 carbon atoms in the presence of a catalyst system comprising (a) a metallocene complex of the general formula

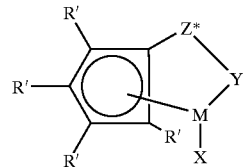

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a $\pi$ complex with M;

Y is —O—, —S—, —NR*—, —PR*—,

M is titanium or zirconium in the +2 formal oxidation state;

Z* is $SiR^*_2$, $CR^*_2$, $SiR^*_2SIR^*_2$, $CR^*_2CR^*_2$, $CR^*=CR^*$, $CR^*_2SIR^*_2$, or $GeR^*_2$, wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, (b) an activator, and
(c) a support.

The copolymers of the present invention are most suitably prepared in the gas phase in particular in a continuous process operating at a temperature >60° C. and most preferably at a temperature of 75° C. or above. The preferred process is one comprising a fluidised bed reactor. A particularly suitable gas phase process is that disclosed in EP 699213 incorporated herein by reference.

When prepared by use of the preferred catalyst systems described above the unique copolymers of the present invention have a titanium content in the range 0.1 to 2.0 ppm.

According to another aspect of the present invention there are provided a copolymer comprising ethylene and an alpha olefin having 3 to 10 carbon atoms having
(a) a density in the range 0.900 to 0.940
(b) an apparent Mw/Mn of 2.5–3.0
(c) $I_{21}/I_2$ of 15 to 25, and
(d) a melting point of 95° C. to 135° C.

The copolymers according to the present invention may be used to prepare the full range of products normally manufactured from polyethylene copolymer products in the density range 900 to 940 kg/m$^3$. They may also be used blended with other polymers such as low density polyethylenes, linear low density polyethylenes, medium density polyethylenes, high density polyethylenes, plastomers and elastomers. Examples of applications include injection moulding, rotomoulding, extrusion into pipes, sheets, films, fibres, non-woven fabrics, cable coverings and other uses which will be known to those skilled in the art Thus according to another aspect of the present invention there is provided a blend of two or more components comprising (a) from about 1 weight percent to about 99 weight percent of a copolymer as hereinbefore described, and (b) from about 99 weight percent to about 1 weight percent of one or more resins that are different from component (a).

The products are particularly suitable for the production of films and sheets prepared using traditional methods well known in the art. Examples of such methods are film blowing, film casting and orientation of the partially crystallised product. The films exhibit good processability, improved optical and mechanical properties and good heat sealing properties.

The films exhibit a haze ranging from 3 to 20, a dart impact >100 g and also exhibit a low hexane extractable content of 0.1–1.5%.

Thus according to another aspect of the present invention there is provided a film exhibiting a haze determined by ASTM D-1003 ranging from 3 to 20, a dart impact measured by ASTM D-1709 of >100 g, a hexane extractables content of 0.1–1.5%, said film comprising a copolymer of ethylene and an alpha-olefin having 3–10 carbon atoms and which has (a) a density in the range 0.900 to 0.940
(b) an apparent Mw/Mn of 2–3.4
(c) $I_{21}/I_2$ from 16 to 24
(d) activation energy of flow from 28 to 45 kJ/mol
(e) a ratio Ea(HMW)/Ea(LMW)>1.1, and
(f) a ratio g'(HMW)/g'(LMW) from 0.85 to 0.95

Preferred films are those exhibiting a haze determined by ASTM D-1003 ranging from 3 to 20, a dart impact measured by ASTM D-1709 of >100 g, a hexane extractables content of 0.1–1.5% said film comprising a copolymer of ethylene and an alpha-olefin having 3–10 carbon atoms and which has (a) a density in the range 0.900 to 0.940
(b) apparent Mw/Mn in the range 2.5 to 3
(c) $I_{21}/I_2$ from 18–24
(d) activation energy of flow from 30 to 35 kJ/mol
(e) a ratio Ea(HMW)/Ea(LMW)>1.2, and
(f) a ratio g'(HMW)/g'(LMW) from 0.85 to 0.95

In another aspect of the present invention there is provided a film exhibiting a haze determined by ASTM D-1003 ranging from 3 to 20, a dart impact measured by ASTM D-1709 of >100 g, a hexane extractables content of 0.1–1.5% said film comprising a copolymer of ethylene and an alpha-olefin having 3–10 carbon atoms and which has (a) a density in the range 0.900 to 0.940
(b) an apparent Mw/Mn of 2.5–3.0
(c) $I_{21}/I_2$ of 15 to 25, and
(d) melting point in the range 95° C. to 135° C.

The films may be suitable for a number of applications for example industrial, retail, food packaging, non-food packaging and medical applications. Examples include films for bags, garment bags, grocery sacks, merchandise bags, self-serve bags, grocery wet pack, food wrap, pallet stretch wrap, bundling and overwrap, industrial liners, refuse sacks, heavy duty bags, agricultural films, daiper liners, etc.

The films may be utilised as shrink film, cling film, stretch film, sealing film or other suitable type.

Methods of Test

Melt index (190/2.16) was measured according to ISO 1133.

Melt flow ratio (MFR) was calculated from the ratio of flow rates determined according to ISO 1133 under condition (190/21.6) and condition (190/2.16).

Density was measured using a density column according to ISO 1872/1-1986, except that the melt index extrudates were not annealed but were left to cool on a sheet of polymeric material for 30 minutes.

Apparent molecular weight distribution and associated averages, uncorrected for long chain branching, were determined by Gel Permeation Chromatography using a Waters 150CV. The solvent used was 1,2,4 Trichlorobenzene at 145° C., stabilised with 0.05% BHT. The nominal flow rate was 1 ml/min. Solutions of concentration 0.05 to 0.1%w/w were prepared at 155° C. for 1.5 to 2 hours with stirring, and the nominal injection volume was set at 250 ml. 3 Shodex AT80M/S columns were used with a plate count (at half height) of typically 23,000. The differential refractometer detector alone was used for these studies. Calibration was achieved using broad molecular weight linear polyethylene standards as described previously (Analysis, 1976, Vol 4 no 10, p450). A correction for dispersion broadening was applied as described by Hamielec (J.Appl. Polymer Sci., 14, 1519 (1970). This calibration has been checked against the NIST certified polyethylene SRM1475, the values obtained being 52,000 for Mw and 19,800 for Mn.

Molecular weight distribution and associated averages, corrected for LCB, together with g' values as a function of MW were determined by GPC/OLV using a Waters 150CV fitted with a Viscotek 150R differential viscometer. The Trisec version 3 software supplied by Viscotek was used for data treatment. SRM1475 was used as a linear reference polymer. The solvent used was 1,2,4 Trichlorobenzene at 142° C., stabilised with 0.2 g/l Santonox R. The flow rate was nominally 1 ml/min, the injection volume 400 µl and the concentration injected 0.7 to 0.8 mg/ml. The system was operated with 3 Shodex columns AT806MS, UT607S and AT804S, plus a Waters HR2 column. A Universal Calibration was constructed using narrow polystyrene standards and the Mark Houwink constants thus obtained experimentally for polystyrene were logK=−3.8283, alpha=0.687. Polyethylene Mark Houwink constants obtained from analysis of SRM1475 were logK=−3.335, alpha=0.705, and these were used in the calculations of g'.

The values for g'(HMW)/g'(LMW) were obtained from measurements of g' vs molecular weight obtained using the GPC/OLV system as described above. The values were calculated as the weighted mean value over the range of interest, as follows:

$$g'(HMW)/g'(LMW) = \sum_{i70}^{i100} w_i \cdot g'_i \Big/ \sum_{i0}^{i30} w_i \cdot g'_i$$

where for each molecular weight slice of the MWD, $w_i$ is the relative weight of polymer present, $g'_i$ is the measured g' parameter at that molecular weight, and $i_x$ defines the slice in the MWD at which x% by wt. of the polymer has lower molecular weight.

Melting behaviour was determined by differential scanning calorimetry using a Perkin Elmer DSC-7 instrument, following the methodology outlined in ASTM D3417 except that the first heating was carried out at 20° C./min. The peak melting temperature was taken as the temperature corresponding to the maximum heat flow observed during the second heating of the polymer at 10° C./min.

The titanium content of the copolymers was measured indirectly from an analysis by X-ray fluorescence (XFR) of silicon content in the polymer and the known composition of the catalyst in terms of silica and reactive species supported thereon. The quantity of titanium in the catalyst was determined by either inductively coupled plasma atomic emission spectroscopy (ICP-AES) or stomic absorption (AA).

Hexane extractable content, after extraction for 2 hours, was determined on film samples according to ASTM D-5227 except that the volume of solvent used was 300 ml.

Dart impact was measured by ASTM D1709, tear strength by ASTM D1922, and haze by ASTM D1003.

Flow Activation Energy (Ea) Measurement

Rheological measurements were carried out on a Rheometrics RDS-2 with 25 mm diameter parallel plates in the dynamic mode. Two strain sweep (SS) experiments were initially carried out to determine the linear viscoelastic strain that would generate a torque signal which is greater than 10% of the full scale (2000 g-cm) of the transducer over the full frequency (eg 0.01 to 100 rad/s) and temperature (eg 170° to 210° C.) ranges. The first SS experiment was carried out at the highest test temperature (eg 210° C.) with a low applied frequency of 0.1 rad/s. This test is used to determine the sensitivity of the torque at low frequency. The second experiment was carried out at the lowest test temperature (eg 170° C.) with a high applied frequency of 100 rad/s. This is to ensure that the selected applied strain is well within the linear viscoelastic region of the polymer so that the oscillatory rheological measurements do not induce structural changes to the polymer during testing. This procedure was carried out for all the samples.

The bulk dynamic Theological properties (eg G', G" and $\eta^*$) of all the polymers were then measured at 170°, 190° and 210° C. At each temperature, scans were performed as a function of angular shear frequency (from 100 to 0.01 rad/s) at a constant shear strain appropriately determined by the above procedure.

The dynamic rheological data was then analysed using the Rheometrics RHIOS V4.4 Software. The following conditions were selected for the time-temperature (t-T) superposition and the determination of the flow activation energies $(E_a)$ according to an Arrhenius equation, $a_T = \exp(E_a/kT)$, which relates the shift factor $(a_T)$ to $E_a$:

| Rheological Parameters: | G'(w), G"(w) & h*(w) |
|---|---|
| Reference Temperature: | 190° C. |
| Shift Mode: | 2D (ie horizontal & vertical shifts) |
| Shift Accuracy: | High |
| Interpolation Mode: | Spline |

The flow activation energy as obtained by the above t-T superposition procedure over the four decades of test frequency (ie 0.01 to 100 rad/s) is defined as an average flow activation energy, $E_a$(average), while that over the two decades angular frequency of 0.01 to 1 rad/s as the Higher Molecular Weight flow activation energy, $E_a$(HMW) and that over the two decades angular frequency of 1 to 100 rad/s as the Lower Molecular Weight flow activation energy, $E_a$(LMW).

The present invention will now be further illustrated by reference to the accompanying Examples.

Catalyst Preparation (i) Treatment of Silica

A suspension of Grace 948 silica (13 kg, previously calcined at 250° C. for 5 hours) in 110 liters (L) of hexane was made up in a 240 L vessel under nitrogen. 1 L of a hexane solution containing 2 g/L of Stadis 425 was added and stirred at room temperature for 5 minutes. 29.1 L of a 892 mmolAl/L solution of triethylaluminium (TEA) in hexane was added slowly to the stirred suspension over 30 minutes, while maintaining the temperature of the suspension at 30° C. The suspension was stirred for a further 2 hours. The hexane was filtered, and the silica washed with hexane, so that the aluminium content in the final washing was less than 0.5 mmol Al/liter. Finally the suspension was dried in vacuo at 60° C. to give a free flowing treated silica powder with residual solvent less than 0.5 wt %.

(ii) Catalyst Fabrication

All steps, unless otherwise stated, of the catalyst fabrication were carried out at 20° C. 3 L of toluene was added to a 24 L vessel equipped with a turbine stirrer, and stirred at 300 rpm. 5.01 L of a 9.5 wt % solution in toluene of bis(hydrogenated tallow alkyl) methyl ammonium tris (pentafluorophenyl)(4-hydroxyphenyl)borate was added during 15 minutes. Then 1.57 L of a 250 mmolAl/L solution in toluene of triethylaluminium was added during 15 minutes and mixture stirred for 30 minutes. The solution obtained was then transferred under nitrogen, with stirring during 2 hours, to an 80 L vessel containing 10 kg of the TEA treated silica described above. 60 L of hexane was then rapidly introduced and mixed for 30 minutes. 1.83 kg of a 7.15 wt % solution in heptane of (t-butylamido)(tetramethyl-$\eta^5$-cyclopentadienyl) dimethylsilanetitanium-$\eta^4$-1,3-pentadiene was added during 15 minutes. Mixing was continued for 1 hour and 1 L of a 2 g/L hexane solution of stadis 425 was added. The catalyst slurry was then transferred to a vessel of volume 240 L and 70 L of hexane added. Excess solvent was removed by decantation, and a further 130 L of hexane added. This process was repeated until less than 0.2 L of toluene remained in the solvent. 1 L of a 2 g/L hexane solution of stadis 425 was then added and the catalyst dried under vacuum at 40° C. to a residual solvent level of 1 wt %.

(iii) Polymerisation using Continuous Fluidised Bed Reactor

EXAMPLE 1

Ethylene, 1-hexene, hydrogen and nitrogen were fed into a continuous fluidised bed reactor of diameter 45 cm. Polymer product was continuously removed from the reactor. Operating conditions are given in Table 1.

The results are given below in Table 2 together with typical values of a LLDPE copolymer from ethylene and 1-hexene exemplified in the literature from WO 94/14855.

After degassing, the powder product withdrawn from the reactor was compounded using a ZSK58 twin screw extruder (the additive package being 1250 ppm calcium stearate, 500 ppm Irganox 1076 and 800 ppm Irgafos PEPQ). Blown film was produced at 50 kg/hr on a Reifenhauser film line equipped with a die of diameter 150 mm and die gap 2.3 mm. The film extrusion conditions and properties of the resultant films are also shown in Table 2.

EXAMPLES 2 AND 3

The catalyst of example 1 was used to produce the ethylene/1-hexene copolymers of examples 2 and 3 using the polymerisation conditions shown in Table 1. Structural properties of these copolymers and films thereof are shown in Table 2.

EXAMPLES 4 AND 5

The procedure used in example 1 was scaled up to produce a catalyst of batch size approx. 75 kg. This catalyst was used to prepare copolymers in a commercial gas phase scale reactor of diameter 5 meters again using the polymerisation conditions shown in Table 1. Copolymers of ethylene and 1-hexene were prepared of melt index about 1 g/10 min. and density 0.918 g/cc. The structural properties of the copolymers and films thereof are shown in Table 2.

TABLE 1

| Example | 1 | 2 | 3 | 4 | 5 |
|---|---|---|---|---|---|
| total pressure (bar) | 17.9 | 18.9 | 19.0 | 19.8 | 20 |
| temperature (° C.) | 80 | 75 | 70 | 75 | 75 |
| ethylene pressure (bar) | 5.6 | 5.7 | 4.0 | 8.1 | 8.2 |
| $H_2/C_2$ ratio | 0.0020 | 0.0025 | 0.0024 | 0.0023 | 0.0023 |
| $C_6/C_2$ ratio | 0.0040 | 0.0044 | 0.0036 | 0.0050 | 0.0049 |
| production (kg/hr) | 41 | 45 | 38 | 8700 | 10000 | vantage compared to the LLDPE whereas the mechanical properties show a considerable improvement in dart impact, machine direction (MD) tear and optical properties. In the case of film example 6c a stable extrusion was observed at a thickness of 8 μm, indicating highly beneficial draw down and bubble stability properties.

TABLE 3

| Example | 6(a) | 6(b) | 6(c) | Dowlex 2045 | Dowlex 2045 |
|---|---|---|---|---|---|
| Blend | Pure | +20% EVA | Pure | Pure | +20% EVA |
| Melt pressure (bar) | 465 | 450 | 430 | 485 | 460 |
| Motorload (Amps) | 480 | 450 | 450 | 440 | 43075 |
| Output (kg/hr) | 339 | 353 | 275 | 336 | 340 |
| Film thickness (μm) | 15 | 15 | 8 | 15 | 15 |
| dart impact (g) | >550* | 365 | >450* | 110 | 83 |
| MD tear (g/25 μm) | 197 | 106 | 174 | 150 | 74 |

TABLE 2

Structure and film properties

| Property/Condition | Example 1 | 2 | 3 | 4 | 5 | LLDPE* |
|---|---|---|---|---|---|---|
| Melt Index (dg/min) | 1.04 | 1.57 | 1.2 | 1.3 | 1.07 | 1.0 |
| MFR ($I_{21}/I_2$) | 20.2 | 21.5 | 22.9 | 19.8 | 21.3 | 18 |
| Density (g/cc) | 0.9185 | 0.9173 | 0.9198 | 0.9189 | 0.9184 | 0.918 |
| $M_w$ (uncorrected for LCB) | 92,200 | 85,500 | 93,800 | 96,000 | 102,600 | |
| $M_w/M_n$ (uncorrected for LCB) | 2.33 | 2.5 | 3.2 | 2.7 | 2.6 | 2.6 |
| g'(HMW)/g'(LMW) | 0.912 | 0.915 | 0.912 | | | |
| Activation energy of flow (kJ/mol) | 32 | | | 32 | 33 | |
| Ea(HMW)/Ea(LMW) | 1.55 | | | 1.29 | 1.34 | |
| Peak melting temperature (° C.) | 116.4 | 117.3 | 118.4 | 117.9 | 118.0 | 115 |
| CDBI (%) | 73 | | | | | |
| Silicon analysis by XRF (ppm w/w) | | | | 168 | 180 | |
| titanium content (ppm) | | | | 0.32 | 0.35 | |
| dart impact (g) | >1200 | >1200 | >1200 | >1300 | >1300 | >800 |
| Unsaturations by $^1H$ nmr | | | | | | |
| cis + trans | 0.05 | 0.04 | | | | |
| tri | 0.07 | 0.06 | | | | |
| vinyl | <0.02 | <0.02 | | | | |
| vinylidene | <0.02 | <0.02 | | | | |
| hexane extractables (wt %) | 0.3 | | | | | 0.6 |
| haze (%) | 9.6 | 13.5 | 19.6 | 9.8 | 9 | 5–7 |
| gloss | 58.3 | 44.6 | 34.1 | 54 | 59 | |
| MD tear strength (g/25 μm) | 188 | 210 | 210 | 174 | 157 | 370 |

NB. *represents published data from WO 94/14855

EXAMPLE 6

A product prepared by a similar route to example 1, and having a melt index of 1.23 and a density of 918.2, was blown into thin film using a Reifenhauser extrusion line equipped with a die of diameter 600 mm and die gap 2.4 mm. The blow up ratio was 3:1. Both the pure product and a blend with 20% ethylene vinyl acetate (EVA) copolymer (3% VA, VF22F564 supplied by BP Chemicals) were extruded. The results are given in Table 3, in comparison to a commercial LLDPE, Dowlex 2045. It can be seen that for the examples 6a–c there is no significant processing disad- TABLE 3-continued

| Example | 6(a) | 6(b) | 6(c) | Dowlex 2045 | Dowlex 2045 |
|---|---|---|---|---|---|
| Haze (%) | 14 | 6 | 11 | 17 | 6 |
| Gloss | 37 | 67 | 37 | 34 | 64 |

*measurement limited by dart hitting base of apparatus

What is claimed is:

1. A copolymer of ethylene and an alpha olefin having 3 to 10 carbon atoms, said polymer having:
   (a) a density in the range 0.900 to 0.940
   (b) an apparent Mw/Mn of 2–3.4
   (c) $I_{21}/I_2$ from 16 to 21.5
   (d) activation energy of flow from 28 to 45 kJ/mol
   (e) a ratio Ea(HMW)/Ea(LMW)>1.1, and
   (f) a ratio g'(HMW)/g'(LMW) from 0.85 to 0.95.

2. The copolymer according to claim 1 having an apparent Mw/Mn in the range 2 to 3 and $I_{21}/I_2$ from 18 to 21.5.

3. The copolymer according to claim 2 having an apparent Mw/Mn in the range 2.5 to 3, an activation energy of flow from 30 to 35 kJ/mol., and a ratio Ea(HMW)/Ea(LMW) >1.2.

4. The copolymer according to claim 1 having a titanium content in the range 0.1 to 2.0 ppm.

5. A film exhibiting a haze determined by ASTM D-1003 ranging from 3 to 20, a dart impact measured by ASTM D-1709 of >100 g, a hexane extractables content of 0.1–1.5%, said film comprising a copolymer of ethylene and an alpha-olefin having 3–10 carbon atoms and which has
   (a) a density in the range 0.900 to 0.940
   (b) an apparent Mw/Mn of 2–3.4
   (c) $I_{21}/I_2$ from 16 to 21.5
   (d) activation energy of flow from 28 to 45 kJ/mol
   (e) a ratio Ea(HMW)/Ea(LMW)>1.1, and
   (f) a ratio g'(HMW)/g'(LMW) from 0.85 to 0.95.

6. The film according to claim 5 wherein the copolymer has an apparent Mw/Mn in the range 2.5 to 3, an activation energy of flow from 30 to 35 kJ/mol., and a ratio Ea(HMW)/Ea(LMW)>1.2.

7. A copolymer comprising ethylene and an alpha olefin having 3 to 10 carbon atoms having
   (a) a density in the range 0.900 to 0.940
   (b) an apparent Mw/Mn of 2.5–3.0
   (c) $I_{21}/I_2$ from 15 to 21.5, and
   (d) a melting point in the range 95° C. to 135° C.

8. A film exhibiting a haze determined by ASTM D-1003 ranging from 3 to 20, a dart impact measured by ASTM D-1709 of >100 g, a hexane extractables content of 0.1–1.5%, said film comprising a copolymer of ethylene and an alpha-olefin having 3–10 carbon atoms and which has
   (a) a density in the range 0.900 to 0.940
   (b) an apparent Mw/Mn of 2.5–3.0
   (c) $I_{21}/I_2$ from 15 to 21.5, and
   (d) a melting point in the range 95° C. to 135° C.

* * * * *